(12) United States Patent
Lewis

(10) Patent No.: US 11,808,309 B2
(45) Date of Patent: Nov. 7, 2023

(54) LUBRICATION SYSTEM

(71) Applicant: AERO GEARBOX INTERNATIONAL, Colombes (FR)

(72) Inventor: Nathan Lewis, Moissy-Cramayel (FR)

(73) Assignee: AERO GEARBOX INTERNATIONAL, Colombes (FR)

( * ) Notice: Subject to any disclaimer, the term of this patent is extended or adjusted under 35 U.S.C. 154(b) by 344 days.

(21) Appl. No.: 17/343,601

(22) Filed: Jun. 9, 2021

(65) Prior Publication Data

US 2021/0388871 A1   Dec. 16, 2021

(30) Foreign Application Priority Data

Jun. 10, 2020  (FR) ........................................ 2006049

(51) Int. Cl.
*F16D 3/06*   (2006.01)
*F16H 57/04*  (2010.01)

(52) U.S. Cl.
CPC ............. *F16D 3/06* (2013.01); *F16H 57/043* (2013.01); *F16D 2300/06* (2013.01)

(58) Field of Classification Search
CPC ...... F01D 25/18; F16D 3/06; F16D 2001/103; F16D 2300/06; F16H 57/043; F16H 57/0434; F16N 7/36; F16N 7/363; F16N 9/02; F16N 11/12; F16N 2210/02; F16N 2210/12
USPC ........................................................ 464/7, 16
See application file for complete search history.

(56) References Cited

U.S. PATENT DOCUMENTS

| | | | |
|---|---|---|---|
| 3,621,937 A | 11/1971 | Edge et al. | |
| 3,637,049 A * | 1/1972 | Butterfield | F16H 57/043 184/6.12 |
| 4,493,623 A | 1/1985 | Nelson | |
| 5,119,905 A * | 6/1992 | Murray | F16N 21/00 464/7 |
| 5,363,930 A * | 11/1994 | Hern | F16N 9/02 175/371 |
| 5,433,674 A | 7/1995 | Sheridan et al. | |

(Continued)

FOREIGN PATENT DOCUMENTS

| | | |
|---|---|---|
| EP | 2711505 A1 | 3/2014 |
| FR | 2543654 A1 | 10/1984 |

(Continued)

OTHER PUBLICATIONS

French Search Report in corresponding French Patent Application No. 2006049, dated Jan. 12, 2021 (9 pages).

*Primary Examiner* — Josh Skroupa
(74) *Attorney, Agent, or Firm* — Bookoff McAndrews, PLLC

(57) ABSTRACT

An insert for supplying a fluid to splines of a drive shaft, the insert extending along an axis of rotation, and the insert comprising an insert wall extending along the axis of rotation, a reservoir defined by the insert wall for storing a fluid, an elastically deformable portion, the elastically deformable portion capable of transitioning between an expanded state and an unexpanded state, and wherein the elastically deformable portion is configured to expand to the expanded state in a radial direction with respect to the axis of rotation when the fluid is supplied to the reservoir during rotation of the insert and to contract to the unexpanded state when rotation of the insert and supply of the fluid to the reservoir are ceased.

15 Claims, 3 Drawing Sheets

(56) References Cited

U.S. PATENT DOCUMENTS

| | | | | |
|---|---|---|---|---|
| 9,188,215 B2* | 11/2015 | Tage | .................. | F16H 57/043 |
| 10,228,052 B2* | 3/2019 | Slayter | .................. | F16H 57/043 |
| 10,260,615 B2* | 4/2019 | Slayter | .................. | F16H 57/043 |
| 2018/0340568 A1* | 11/2018 | Mikazuki | .................. | F16D 3/06 |
| 2019/0309797 A1* | 10/2019 | Nicoletti | .................. | F16D 1/10 |
| 2021/0388896 A1* | 12/2021 | Lewis | .................. | F16H 57/043 |
| 2022/0049764 A1* | 2/2022 | Lewis | .................. | F16D 3/06 |

FOREIGN PATENT DOCUMENTS

| | | | | |
|---|---|---|---|---|
| FR | 2977280 A1 | 1/2013 | | |
| WO | WO-0107762 A1 * | 2/2001 | .......... | F16H 57/043 |
| WO | WO-2007010152 A2 * | 1/2007 | .......... | F16H 57/043 |

* cited by examiner

[Fig. 1]
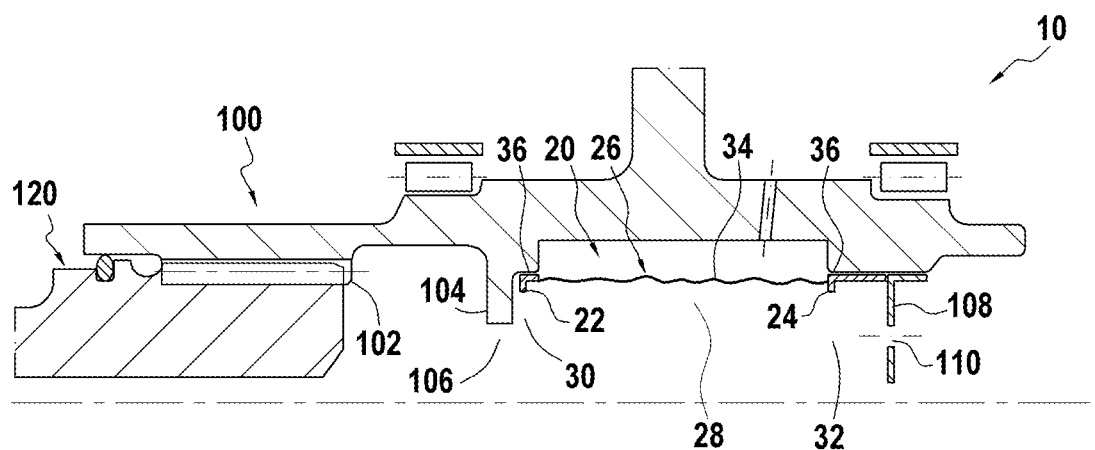
[Fig. 2]
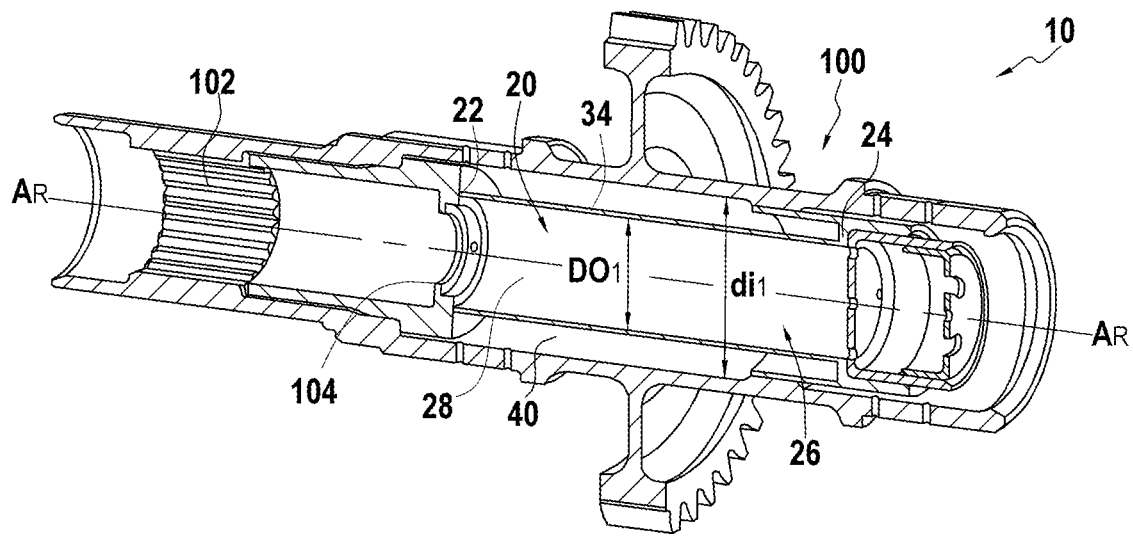

[Fig. 3]
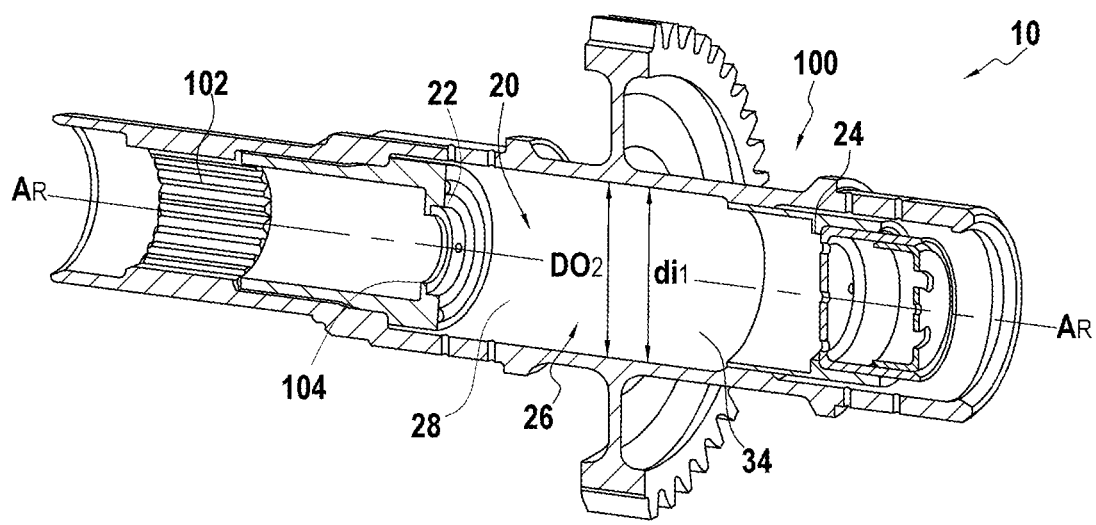
[Fig. 4A]
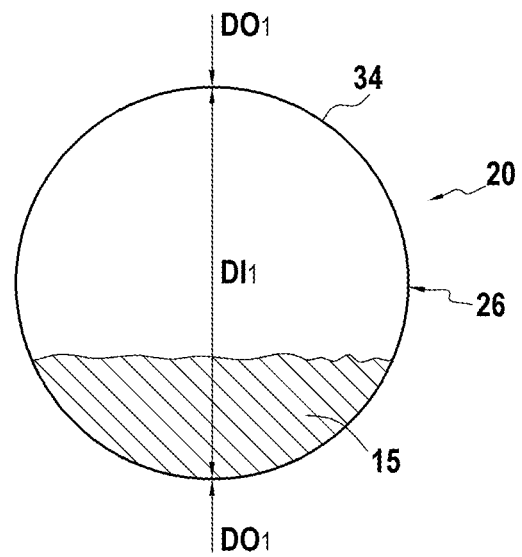

[Fig. 4B]
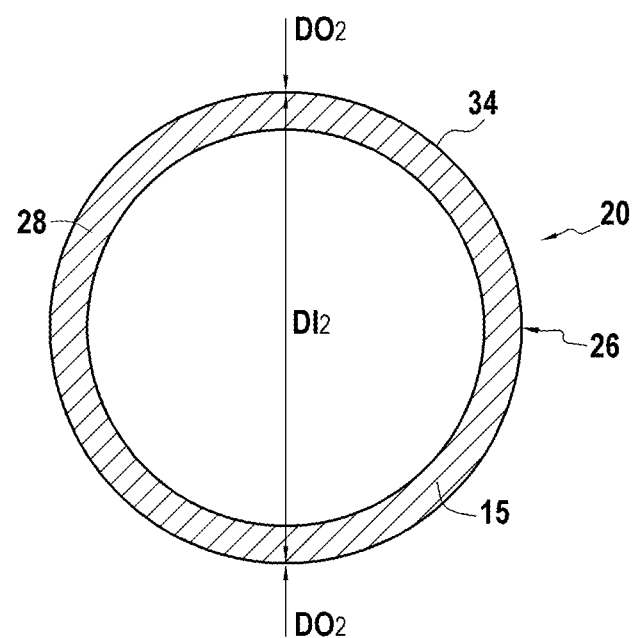

LUBRICATION SYSTEM

CROSS-REFERENCE TO RELATED APPLICATIONS

This application claims benefit to French Patent Application No. 2006049, filed on Jun. 10, 2020, which is incorporated herein by reference in its entirety.

FIELD

The present disclosure relates generally to the field of lubrication systems within a gearbox. More specifically, the present disclosure relates to a lubrication system within a drive shaft of an accessory gearbox.

BACKGROUND

A turbine engine of an aircraft typically includes an accessory gearbox for powering mechanically driven accessory systems, such as fuel pumps, hydraulic pumps, and electrical generators, which are essential to operation of the engine and the aircraft. As is disclosed by French Patent Application FR2977280A1, the accessory gear box may usually include one or more gear trains. Each gear train may usually be made up of a plurality of gearwheels that may be driven in rotation to drive the accessories by a power transmission shaft. The power transmission shaft may be coupled to a shaft of the turbine. Each accessory may include an accessory drive shaft including one or more sets of splines which mesh with a corresponding set of splines of a corresponding gearwheel in order to be driven thereby. Additionally, the power transmission shaft may include one or more sets of splines which mesh with a corresponding set of splines of a corresponding gearwheel in order to drive the gearwheels of the gear train.

In operation, lubrication of the moving parts within the gearbox, such as the splines, is required in order to cool, reduce friction, and thus optimize functionality and lifetime of the gearbox. However, many currently available lubrication systems, particularly one-shot lubrication systems, are not capable of supplying an adequate amount of lubrication in order to supply lubrication to a centerline of an accessory drive shaft, and thus to another set of splines further down the accessory drive shaft and/or a mating drive shaft.

It is desirable to provide an improved system for lubricating moving parts within a gearbox which is capable of increasing the amount of lubricant to be supplied to moving parts within the gearbox, preferably beyond the capabilities of current one-shot lubrication systems, in order to solve one or more technical problems described above.

SUMMARY

According to aspects of the disclosure an insert for supplying a fluid to splines of a drive shaft, the insert extending along an axis of rotation, and the insert comprising an insert wall extending along the axis of rotation, a reservoir defined by the insert wall for storing a fluid, an elastically deformable portion, the elastically deformable portion capable of transitioning between an expanded state and an unexpanded state, and wherein the elastically deformable portion is configured to expand to the expanded state in a radial direction with respect to the axis of rotation when the fluid is supplied to the reservoir during rotation of the insert and to contract to the unexpanded state when rotation of the insert and supply of the fluid to the reservoir are ceased.

According to aspects of the disclosure, the elastically deformable portion is configured to expand due to a centrifugal force exerted by a spinning volume of the fluid during rotation.

According to aspects of the disclosure, the insert wall includes a rigid portion.

According to aspects of the disclosure, the rigid portion comprises a flange.

According to aspects of the disclosure, the rigid portion is bonded to the elastically deformable portion.

According to aspects of the disclosure, the elastically deformable portion is elastomeric.

According to aspects of the disclosure, a system for supplying fluid to splines of a drive shaft comprises a drive shaft comprising a set of splines and a weir positioned adjacent the set of splines, the drive shaft being configured to rotate about an axis of rotation, an insert according to any aspect described above, the insert wall extending concentrically with the drive shaft along the axis of rotation, and wherein the elastically deformable portion of the insert expands to the expanded state during rotation of the drive shaft and contracts to the unexpanded state during cessation of rotation of the drive shaft.

According to aspects of the disclosure, the insert is in communication with the weir and the set of splines at an interface within the drive shaft.

According to aspects of the disclosure, the fluid passes through the interface and spills over the weir to the set of splines when rotation of the drive shaft is ceased.

According to aspects of the disclosure, the insert wall includes a rigid portion.

According to aspects of the disclosure, the rigid portion is secured to the drive shaft to maintain position and anti-rotation of the insert within the drive shaft.

According to aspects of the disclosure, the insert has a first outside diameter in the unexpanded state and a second outside diameter in the expanded state and the first outside diameter is less than an inside diameter of the drive shaft so that a gap is defined between the insert in the unexpanded state and the drive shaft.

According to aspects of the disclosure, the second outside diameter of the insert conforms to the inside diameter of the drive shaft in the expanded state.

According to aspects of the disclosure, the insert is configured to be supplied with the fluid during rotation of the drive shaft.

According to aspects of the disclosure, the insert is configured to supply the fluid to the set of splines and toward the axis of rotation when rotation of the drive shaft is ceased.

According to aspects of the disclosure, a method of supplying fluid to splines of a drive shaft comprises steps of providing a drive shaft, the drive shaft having a set of splines and a weir positioned adjacent the set of splines, providing an insert according to any aspect described above positioned within the drive shaft, the insert being separated from the set of splines by the weir, rotating the drive shaft, supplying fluid to the insert during rotation of the drive shaft, expanding the insert to an expanded state during rotation of the drive shaft, contracting the insert to an unexpanded state during cessation of rotation of the drive shaft, and spilling the fluid supplied to the insert over the weir to the set of splines when rotation of the drive shaft is ceased.

According to aspects of the disclosure, the step of supplying fluid to the insert includes determining an amount of fluid to be supplied dependent upon a diameter of the weir, among other features.

According to aspects of the disclosure, the step of supplying fluid to the insert includes determining an amount of fluid to be supplied dependent upon an inside diameter of the insert in the expanded state of the insert. Additionally or alternatively, the step of supplying fluid to the insert includes determining the amount of fluid to be supplied dependent upon a length of time in which the insert is in the expanded state.

According to aspects of the disclosure, the step of contracting the insert includes settling the fluid within the insert to a collapsed volume of fluid.

In the manner described and according to aspects illustrated herein, the insert, the system, and the method are configured to increase an amount of fluid to be supplied to moving parts within a gearbox, such that fluid may be supplied to splines of the drive shaft, splines of an accessory drive shaft, a centerline of an accessory drive shaft, and/or to another set of splines further down a hollow accessory drive shaft and/or to a mating drive shaft.

BRIEF DESCRIPTION OF THE DRAWINGS

Aspects of an embodiment will be described in reference to the drawings, where like numerals reflect like elements:

FIG. 1 is a side cross-sectional view of a lubrication system (hereafter, "the system") for use in a gearbox according to aspects of the disclosure;

FIG. 2 is a side perspective view of the system of FIG. 1 showing a drive shaft of the system in cross-section and an insert of the system in an unexpanded state in partial cross-section;

FIG. 3 is a side perspective view of the system of FIG. 1 showing the drive shaft in cross-section and the insert of the system in an expanded state;

FIG. 4A is a front cross-sectional view of the insert of the system of FIG. 1 in the unexpanded state and showing a collapsed volume of fluid; and FIG. 4B is a front cross-sectional view of the insert of the system of FIG. 1 in the expanded state and showing a spinning volume of fluid.

DETAILED DESCRIPTION

An embodiment of a lubrication system (hereafter, "the system") for use within a gearbox according to aspects of the disclosure will now be described with reference to FIGS. 1-4B, wherein like numerals represent like parts, and will generally be referred to by the reference numeral 10. Particularly, an insert 20 of the system 10 for use within a gearbox according to aspects of the disclosure will be described. Although the system 10 and the insert 20 are described with reference to specific examples, it should be understood that modifications and changes may be made to these examples without going beyond the general scope as defined by the claims. In particular, individual characteristics of the various embodiments shown and/or mentioned herein may be combined in additional embodiments. Consequently, the description and the drawings should be considered in a sense that is illustrative rather than restrictive. The Figures, which are not necessarily to scale, depict illustrative aspects and are not intended to limit the scope of the disclosure. The illustrative aspects depicted are intended only as exemplary.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

Various materials, methods of construction and methods of fastening will be discussed in the context of the disclosed embodiment(s). Those skilled in the art will recognize known substitutes for the materials, construction methods, and fastening methods, all of which are contemplated as compatible with the disclosed embodiment(s) and are intended to be encompassed by the appended claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

When an element or feature is referred to herein as being "on," "engaged to," "connected to," or "coupled to" another element or feature, it may be directly on, engaged, connected, or coupled to the other element or feature, or intervening elements or features may be present. In contrast, when an element or feature is referred to as being "directly on," "directly engaged to," "directly connected to," or "directly coupled to" another element or feature, there may be no intervening elements or features present. Other words used to describe the relationship between elements or features should be interpreted in a like fashion (e.g., "between" versus "directly between," "adjacent" versus "directly adjacent," etc.).

Spatially relative terms, such as "top," "bottom," "middle," "inner," "outer," "beneath," "below," "lower," "above," "upper," and the like, may be used herein for ease of description to describe one element or feature's relationship to another element(s) or feature(s) as illustrated in the drawings. Spatially relative terms may be intended to encompass different orientations of a device in use or operation in addition to the orientation depicted in the drawings. For example, if the device in the drawings is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present disclosure.

As shown in FIGS. 1-3, the system 10 is configured for use within a drive shaft (transmission shaft) 100 of an accessory gearbox (hereafter, "the gearbox") (not shown) of an aircraft engine (not shown). However, it is contemplated that the system 10 may be configured for use within a non-accessory gearbox. Additionally or alternatively, it is contemplated that the system 10 may be configured for use within a non-aerospace application. The drive shaft 100 has a cycle of operation including a rotating state wherein the drive shaft 100 rotates about an axis of rotation AR (see FIGS. 2-3). At completion of the cycle of operation, the drive shaft 100 transitions to a resting state wherein rotation of the drive shaft 100 is ceased.

As shown in FIGS. 4A-4B, the system 10 is configured to supply a fluid 15 to one or more sets of splines 102 within the gearbox. Additionally, it is contemplated that the fluid 15 may be supplied toward the axis of rotation $A_R$. In the disclosed embodiment, the fluid 15 is a lubricant configured to cool, reduce friction, and thus optimize operation and lifetime of moving parts, such as the splines 102, within the gearbox. Referring to FIGS. 1-3, the splines 102 may be included on or within one or more of the drive shaft 100 and an accessory drive shaft 120. In the disclosed embodiment, the splines 102 are included within the drive shaft 100 and at an end of the accessory drive shaft 120. The system 10 may be configured to supply the fluid to a joint (spline joint) between the splines 102 of the drive shaft 100 and/or the splines 102 of the accessory drive shaft 120. Additionally or alternatively, the splines 102 may be included further down a centerline (center) of the accessory drive shaft 120 and/or on a mating drive shaft. A volume of the fluid 15 to be supplied to the splines 102 by the system 10 may depend upon the length of the splines 102 and/or a diameter and axial length of an area of the drive shaft 100 surrounding the splines 102 where the splines are to be bathed in the fluid 15.

As shown in FIG. 1, the drive shaft 100 may include a first weir 104 positioned within the drive shaft 100. The first weir 104 is configured to obstruct a flow of the fluid 15 from the insert 20 to the splines 102 within the drive shaft 100. The first weir 104 is positioned adjacent to and/or between the splines 102 and a first end 22 of the insert 20. Alternatively, it is contemplated that the first weir 104 may be integrally formed on the insert 20 at the first end 22 of the insert 20. In this alternative arrangement, the drive shaft 100 may include a stop configured to secure positioning of the insert 20 within the drive shaft 100. A first interface 106 may be defined between the first weir 104 and the insert 20. The drive shaft 100 may include a second weir 108 positioned within the drive shaft 100, which is configured to obstruct a flow of the fluid 15 from a supply line (not shown) to the insert 20 within the drive shaft 100. The second weir 108 is positioned adjacent to and/or between the supply line and a second end 24 of the insert 20, which is opposite the first end 22 of the insert 20. A second interface 110 may be defined between the second weir 108 and the insert 20. The insert 20 may be positioned between the first weir 104 and the second weir 108. A volume of the fluid 15 to be supplied within the system 10 may depend upon a diameter and/or height of the first weir 104 and the second weir 108. As such, changes to the diameter and/or height of the first and second weirs 104, 108 may be carried out to control a volume of the fluid 15 to be supplied within the system 10, as well as for ventilation within the system 10 to balance pressure within the system 10.

As shown in FIGS. 1-4B, the insert 20 of the system 10 is configured to supply the fluid 15 to the splines 102 of the drive shaft 100. Additionally or alternatively, the insert 20 of the system 10 is configured to supply the fluid 15 to the splines 102 of the accessory drive shaft 120 and/or to the centerline of the accessory drive shaft 120. The insert 20 is configured to be positioned within the drive shaft 100. The insert 20 includes an insert wall 26 extending along the axis of rotation $A_R$. In the disclosed embodiment, the insert wall 26 is cylindrical and extends concentrically within the drive shaft 100 along the axis of rotation $A_R$. Referring to FIGS. 4A-4B, the insert 20 includes a reservoir 28 defined by the insert wall 26 configured to store lubricant to supply to the splines 102. As shown in FIG. 1, the insert 20 may include a first opening 30 at the first end 22 in communication with the first interface 106 and/or the first weir 104 and the splines 102 of the drive shaft 100, and/or the splines 102 and centerline of the accessory drive shaft 120. The insert 20 may also include a second opening 32 at the second end 24 in communication with the second interface 110 and/or the second weir 108 and the supply line. The second opening 32 may also be in communication with a ventilation hole of the drive shaft 100.

As illustrated by FIGS. 2-3, the insert 20 is configured to transition between an expanded state and an unexpanded state (the unexpanded state may also be referred to herein as a "contracted state"). The expanded state increases the diameter of the insert 20 to allow the insert 20 to receive a greater volume of the fluid 15 for supplying to the splines 102. The system 10 is configured to only supply the fluid 15 to the splines 102 during the resting state in order to protect the fluid supply line from depletion. The unexpanded state decreases the diameter of the insert 20 to allow the fluid 15 to reach a sufficient height within the insert 20 to be supplied to the splines 102. To this end, the insert wall 26 includes an elastically deformable portion (first portion) 34 which is capable of transitioning between the expanded state and the unexpanded state. In the disclosed embodiment, the elastically deformable 34 portion is elastomeric. The elastically deformable portion 34 also has an effect of reducing the weight of the system 10.

During the cycle of operation, the elastically deformable portion 34, and thus the insert 20, is configured to expand to the expanded state during the rotating state of the drive shaft 100. During rotation of the drive shaft 100, a spinning volume of the fluid 15 within the reservoir 28 of the insert 20 forms toroidal shape due to a centrifugal effect generated by rotation of the drive shaft 100 (see FIG. 4B). The elastically deformable portion 34 expands during the rotating state of the drive shaft 100 due to a centrifugal force exerted on the elastically deformable portion 34 by the spinning volume of the fluid 15 during rotation of the drive shaft 100 (see FIG. 3). In the disclosed embodiment, the elastically deformable portion 34 may be capable of expansion at a threshold rotational speed of the drive shaft 100 in a range between 10% of engine idle speed and engine idle speed. At completion of the cycle of operation, the elastically deformable portion 34, and thus the insert 20, is configured to contract to the unexpanded state during cessation of rotation of the drive shaft 100 (see FIG. 2). It is contemplated that the term "cessation of rotation" as used herein may be understood to mean a period in which rotation of the drive shaft 100 slows to the resting state of the drive shaft 100. The elastically deformable portion 34 may also be configured to contract to the unexpanded state when rotation of the drive shaft 100 is ceased and/or stopped. In the disclosed embodiment, the elastically deformable portion 34 may be capable of contraction at a threshold rotational speed of the drive shaft 100 in a range between 50% of engine idle speed and 0 RPM, but most preferably below 10% of engine idle speed. During the resting state, the fluid 15 within the reservoir 28 of the insert 20 settles to a collapsed volume of the fluid 15 having a height sufficient to reach the splines 102 (see FIG. 4A).

As shown in FIGS. 4A-4B, in the unexpanded state, the insert 20 has a first inside diameter $DI_1$ and a first outside diameter $DO_1$. In the expanded state, the insert 20 has a second inside diameter $DI_2$ and a second outside diameter $DO_2$. In the disclosed embodiment, the first inside diameter $DI_1$ and the first outside diameter $DO_1$ may be a substantially smaller fraction of the second inside diameter $DI_2$ and the second outside diameter $DO_2$. As shown in FIGS. 2-3, the drive shaft 100 has an inside diameter $di_1$. In the disclosed embodiment, the first outside diameter $DO_1$ of the insert is a fraction of the inside diameter dii of the drive shaft 100. Additionally, the second outside diameter $DO_2$ of the insert 20 is equivalent, or substantially equivalent, to the inside diameter dii of the drive shaft 100. The difference between the first outside diameter $DO_1$ of the insert 20 and the inside diameter $di_1$ of the drive shaft 100 allows for a gap 40 to be defined between the insert 20 and the drive shaft 100 when the insert 20 is in the unexpanded state. The gap 40 allows room for the insert to transition from the unexpanded state to the expanded state. The difference between the first outside diameter $DO_1$ of the insert 20 and the inside diameter $di_1$ of the drive shaft 100 allows the insert 20 to conform to the inside diameter dii of the drive shaft 100 without damaging the elastically deformable portion 34 of the insert 20.

Positioning of the insert 20 within the drive shaft 100 is configured to be maintained during the rotating state and the resting state. As shown in FIG. 1, the insert wall 26 may also include a rigid portion (second portion) 36. The rigid portion 36 may be bonded to the elastically deformable portion 34. Additionally, the rigid portion 36 may be interference fit and/or press-fit within the drive shaft 100 to maintain position and anti-rotation of the insert 20 within the drive shaft 100. However, it is contemplated that a person having ordinary skill in the art would appreciate that the rigid portion 36 may be secured within the drive shaft 100 by other configurations, such as threading, bonding, or adhesion within the drive shaft 100. In the disclosed embodiment, the rigid portion 36 is constructed of steel or aluminum, but it is contemplated that a person having ordinary skill in the art would appreciate that the rigid portion 36 may be constructed of any other rigid material which may be compatible with the insert 20.

In operation, the drive shaft 100 transitions from the resting state to the rotating state. The insert 20 is configured to be supplied with the fluid 15 during the rotating state and to supply fluid to the splines 102 at return to the resting state. During rotation, the fluid 15 is supplied from the supply line to the insert 20. The fluid 15 spills over the second weir 108 through the second interface 110, and/or through the second opening 32, into the insert 20. During rotation of the drive shaft 100, the fluid 15 forms the spinning volume within the insert 20 and applies the centrifugal force on the elastically deformable portion 34. The centrifugal force expands the elastically deformable portion 34 from the unexpanded state to the expanded state. In the expanded state, the diameter $DI_2$, $DO_2$ of the insert 20 is increased, thereby increasing the volume of the insert 20. The amount of fluid 15 to be supplied to the insert 20 may be dependent upon the second inside diameter $DO_2$ of the insert 20 in the expanded state. As such, the increased diameter $DI_2$, $DO_2$ of the insert 20, and thus the increased volume of the insert 20, allows the insert 20 to receive a greater volume of the fluid 15 for the system 10 to supply to the splines 102 of the drive shaft 100. Additionally, the greater volume of fluid 15 allows the system 10 to supply the fluid 15 to the splines 102 of the accessory drive shaft 102 and the centerline of the accessory drive shaft 120. As such, the greater volume of fluid 15 may also allow the system 10 to supply fluid to other splines 102 which may be present further down on the accessory drive shaft 120.

At completion of the cycle of operation, the drive shaft 100 transitions from the rotating state to the resting state. During cessation of rotation of the drive shaft 100 and/or when rotation of the drive shaft 100 ceases, the elastically deformable portion 34 contracts from the expanded state to the unexpanded state and the spinning volume of fluid 15 settles to the collapsed volume of fluid 15. In the resting state, the fluid 15 is no longer supplied from the supply line to the insert 20. In the unexpanded state, the collapsed volume of the fluid 15 has a height that is sufficient to spill over the first weir 104 within the drive shaft 100. In the unexpanded state, the collapsed volume of the fluid 15 spills over the first weir 104 through the first interface 106, and/or through the first opening 30, to the splines 102 of the drive shaft 100 and the splines 102 of the accessory drive shaft 120. It is contemplated that a portion of the fluid 15 may be lost by spilling over the second weir 108. Due to the increased volume of the fluid 15 within the reservoir 28 of the insert 20, the system 10 is capable of supplying the fluid 15 to the centerline of the accessory drive shaft 120, and thus to other splines 102 which may be present further down on the accessory drive shaft 120 and/or on a mating drive shaft.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

Additionally, all of the disclosed features of an apparatus may be transposed, alone or in combination, to a method and vice versa.

The invention claimed is:

1. An insert for supplying a fluid to splines of a drive shaft, the insert extending along an axis of rotation, the insert comprising:
    an insert wall extending along the axis of rotation;
    a reservoir defined by the insert wall for storing a fluid;
    an elastically deformable portion, the elastically deformable portion capable of transitioning between an expanded state and an unexpanded state; and
    wherein, the elastically deformable portion is configured to expand to the expanded state in a radial direction with respect to the axis of rotation when the fluid is supplied to the reservoir during rotation of the insert and to contract in to the unexpanded state when rotation of the insert and supply of the fluid to the reservoir are ceased.

2. The insert of claim 1, wherein the elastically deformable portion is configured to expand due to a centrifugal force exerted by a spinning volume of the fluid during rotation.

3. The insert of claim 1, wherein the insert wall includes a rigid portion.

4. The insert of claim 3, wherein the rigid portion comprises a flange.

5. The insert of claim 3, wherein the rigid portion is bonded to the elastically deformable portion.

6. The insert of claim 1, wherein the elastically deformable portion is elastomeric.

7. A system for supplying a fluid to splines of a drive shaft, the system comprising:
 a drive shaft comprising a set of splines and a weir positioned adjacent the set of splines, the drive shaft configured to rotate about an axis of rotation;
 an insert according to claim 1, the insert wall extending concentrically with the drive shaft along the axis of rotation; and
 wherein, the elastically deformable portion of the insert expands to the expanded state during rotation of the drive shaft and contracts to the unexpanded state during cessation of rotation of the drive shaft.

8. The system of claim 7, wherein the insert is in communication with the weir and the set of splines at an interface within the drive shaft.

9. The system of claim 8, wherein the fluid passes through the interface and spills over the weir to the set of splines when rotation of the drive shaft is ceased.

10. The system of claim 7, wherein the insert wall includes a rigid portion.

11. The system of claim 10, wherein the rigid portion is secured to the drive shaft to maintain position and anti-rotation of the insert within the drive shaft.

12. The system of claim 7, wherein the insert has a first outside diameter in the unexpanded state and a second outside diameter in the expanded state and the first outside diameter is less than an inside diameter of the drive shaft so that a gap is defined between the insert in the unexpanded state and the drive shaft.

13. The system of claim 12, wherein the second outside diameter of the insert conforms to the inside diameter of the drive shaft in the expanded state.

14. The system of claim 7, wherein the insert is configured to be supplied with the fluid during rotation of the drive shaft.

15. The system of claim 7, wherein the insert is configured to supply the fluid to the set of splines and toward the axis of rotation when rotation of the drive shaft is ceased.

\* \* \* \* \*